US005950999A

United States Patent [19]

Lin

[11] Patent Number: 5,950,999

[45] Date of Patent: Sep. 14, 1999

[54] SUPPORT DEVICE HAVING AN ANGLE ADJUSTING MECHANISM

[76] Inventor: Huang Lung Lin, 9F-2 No. 773 Da Duen Road, Taichung, Taiwan

[21] Appl. No.: 09/090,959

[22] Filed: Jun. 4, 1998

[30] Foreign Application Priority Data

Aug. 28, 1997 [GB] United Kingdom ................... 9718042

[51] Int. Cl.$^{6}$ ....................................................... B23Q 3/02

[52] U.S. Cl. ............................ 269/139; 269/16; 269/901; 269/220; 269/141

[58] Field of Search .................................... 269/139, 901, 269/220, 224, 16, 140, 141

[56] References Cited

U.S. PATENT DOCUMENTS 2,502,784 4/1950 Fahlander ................................ 269/139
3,643,935 2/1972 Bell ........................................... 269/16
3,848,865 11/1974 Bird .......................................... 269/69
4,159,821 7/1979 Hickman ................................ 269/139
4,865,496 9/1989 Challis ............................... 408/115 R
4,909,491 3/1990 Cheng ...................................... 269/16
5,065,989 11/1991 Ho .......................................... 269/139

*Primary Examiner*—David A. Scherbel
*Assistant Examiner*—Lee Wilson

[57] ABSTRACT

A support device includes two beams secured on top of a base and two bolts rotatably received in the beams. Two slides are slidably engaged in the beams and engaged with the bolt and for allowing the bolt to move the slide along the beam when the bolt is rotated. Two seats are secured to the slides and two brackets are pivotally coupled to the seats for supporting a plate. One or both of the brackets include a fastener for engaging with either of the orifices and for securing the plate and the brackets to the seats at various angular positions.

4 Claims, 6 Drawing Sheets

SUPPORT DEVICE HAVING AN ANGLE ADJUSTING MECHANISM

BACKGROUND OF THE INVENTION

1. Field of the Invention

The present invention relates to a support device, and more particularly to a support device having an angle adjusting mechanism.

2. Description of the Prior Art

Typical wood working machines, such as planers, cutting machines, sewing machines, is required to be supplied with a long wood work piece. One or more table plates are secured on top of the base for supporting the work piece. However, the table plate may not be easily adjusted to different angular position for guiding or clamping the work piece.

The present invention has arisen to mitigate and/or obviate the afore-described disadvantages of the conventional support devices for work pieces.

SUMMARY OF THE INVENTION

The primary objective of the present invention is to provide a support device having a table plate that may be easily adjusted to various angular positions.

In accordance with one aspect of the invention, there is provided a support device for a work piece, the support device comprises a base including an upper portion having two beams, two bolts rotatably received in the beams, two slides slidably engaged in the beams and each including an inner thread for engaging with the bolt and for allowing the bolt to move the slide along the beam when the bolt is rotated, two seats secured to the slides respectively, two brackets pivotally coupled to the seats at a shaft, a plate secured to the brackets. One or more of the seats each includes a number of orifices arranged in a curve which has a center of curvature located at the shaft, at least one of the brackets includes a fastener adapted to be engaged with either of the orifices for securing the plate and the brackets to the seats at various angular positions.

The bracket includes a sleeve for receiving the fastener. The sleeve includes a bore and an inner thread, the fastener includes an outer thread for engaging with the inner thread of the sleeve, a ball is engaged in the sleeve and engaged between the fastener and the seat for engaging with either of the orifices, and a spring is engaged between the ball and the fastener for biasing the ball to engage with either of the orifices.

The sleeve includes a pair of depressions, the fastener includes a head formed on one end and includes a pin secured to the other end, and a spring is engaged between the sleeve and the head for biasing the head to engage with either of the orifices and for biasing the pin to engage with the depressions of the sleeve.

The bracket includes an aperture, the sleeve is engaged in the aperture and includes an annular flange for engaging with the bracket and for preventing the sleeve from being disengaged from the bracket.

The seat includes a number of angular graduations provided beside the orifices, the bracket includes a notch for aligning with the graduations.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 9:
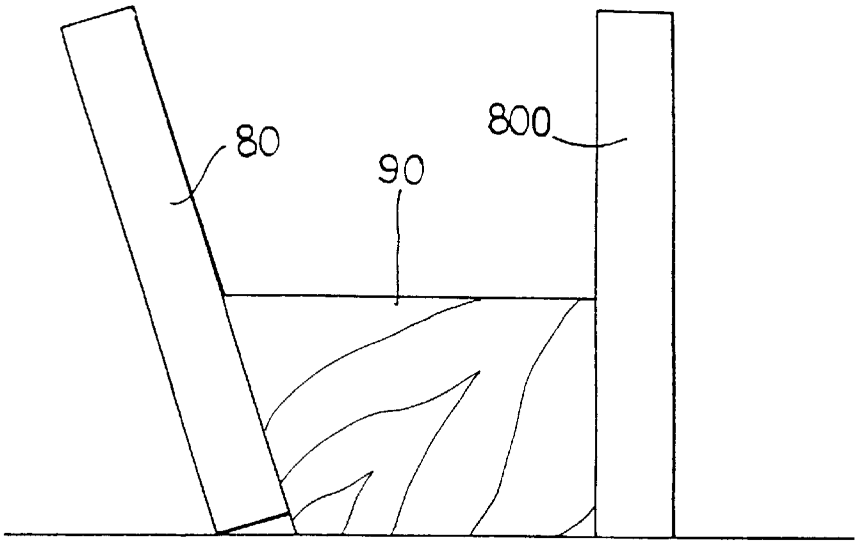
FIG. 9 is a plane views illustrating the application of the angle adjusting mechanism.

Referring to the drawings, and initially to FIGS. 1–5, a support device in accordance with the present invention may support or clamp a work piece 90 (FIG. 9) and comprises a base 20 including four legs or two pairs of frames 20 having an upper portion pivotally coupled to a pair of beams 30 by fastening screws 34 and having a middle portion coupled together by a pair of foldable links 21. A first plate 800 is secured on top of the beams 30. Two bolts 36 are rotatably engaged in the beams 30 and each includes a front end extended outward of the front portion 35 of the beam 30 and a handle 37 secured to the front end for rotating the bolt 36. Two slides 40 are slidably engaged in the beams 30 and each includes an inner thread 41 for threadedly engaging with the bolt 36 and each includes a screw 42 extended upward through a longitudinal slot 311 in the upper portion 31 of the beam 30.

Figure 1:
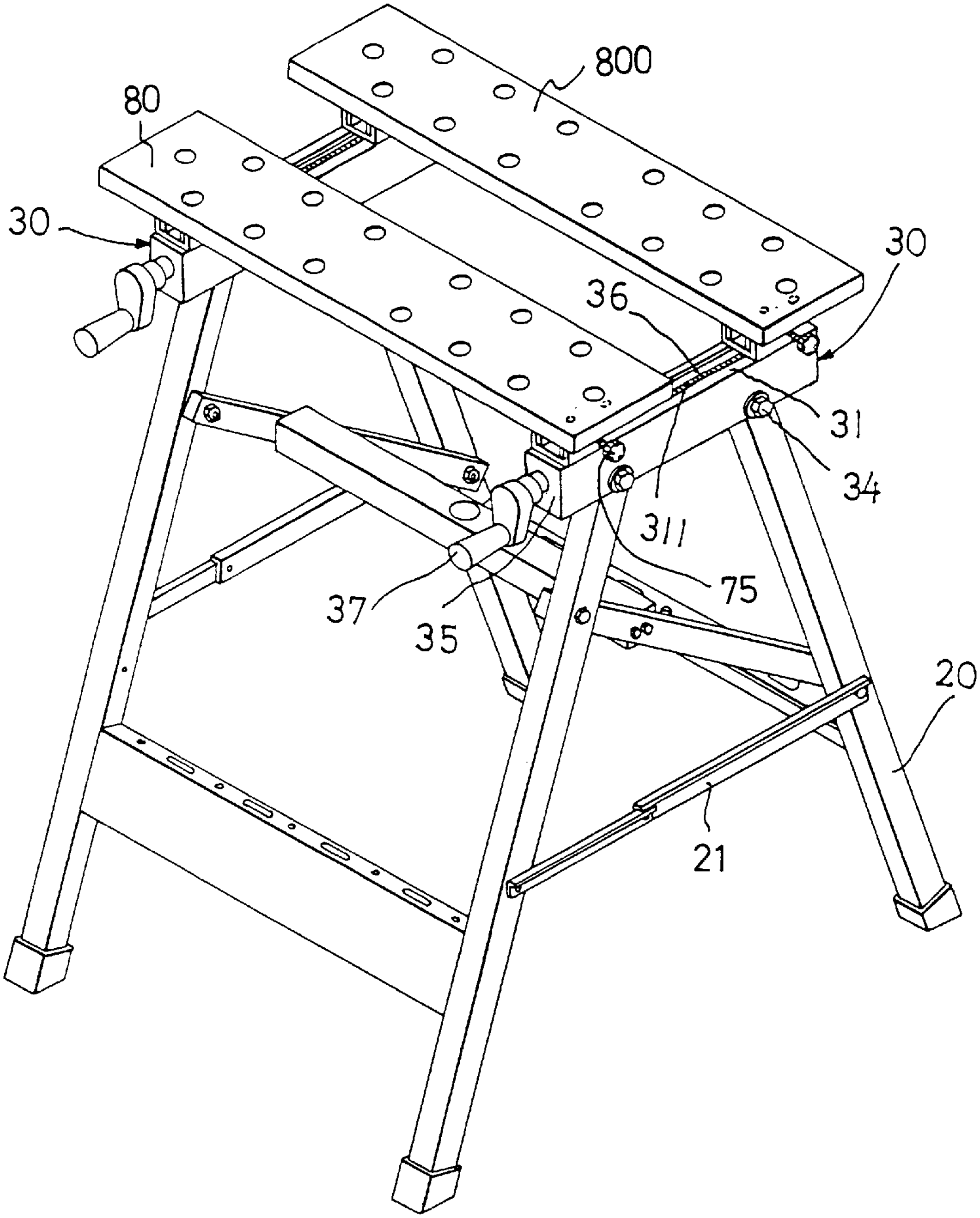
FIG. 1 is a perspective view of a support device.
Figure 2:
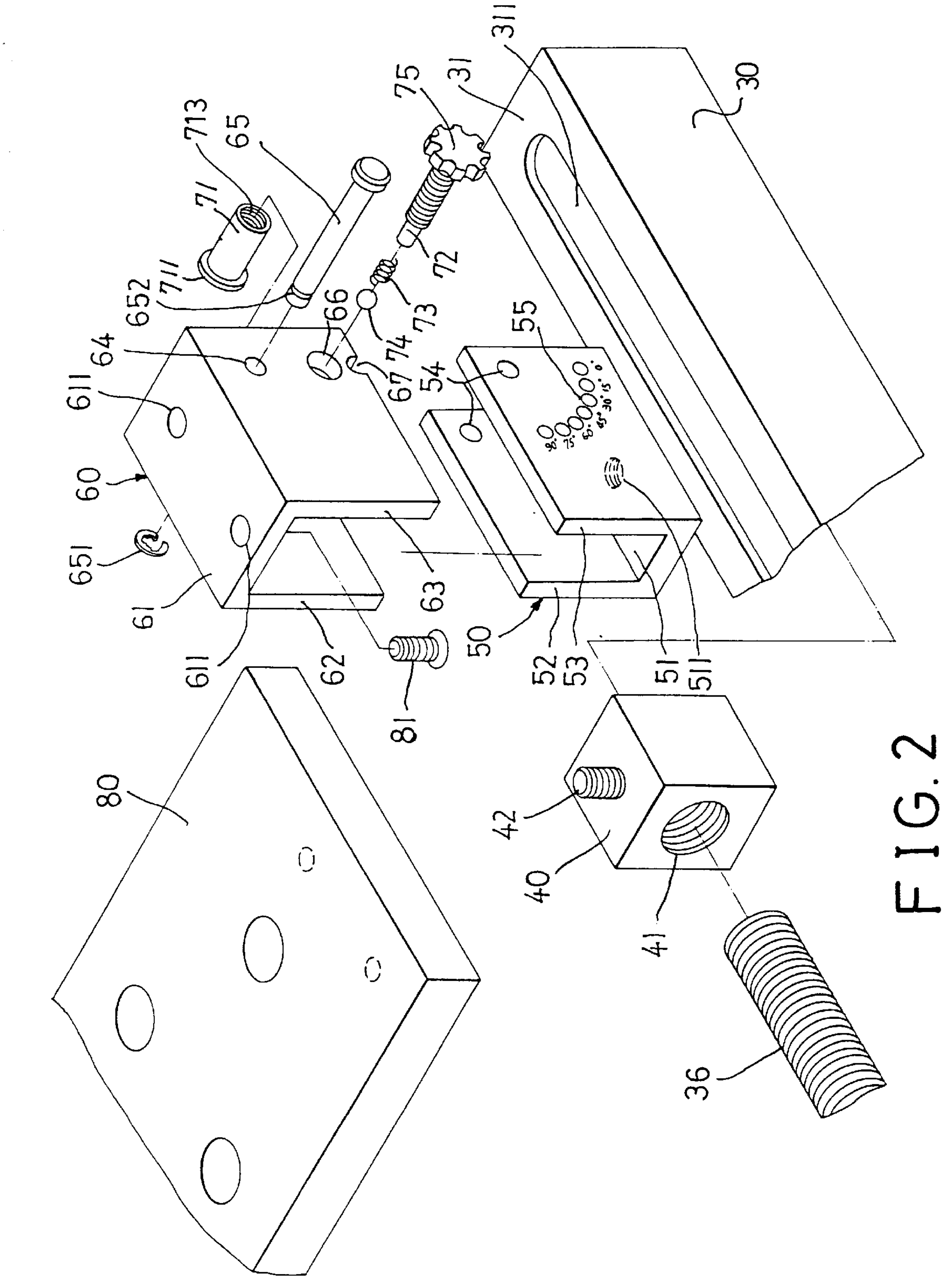
FIG. 2 is a partial exploded view of the device.
Figure 3:
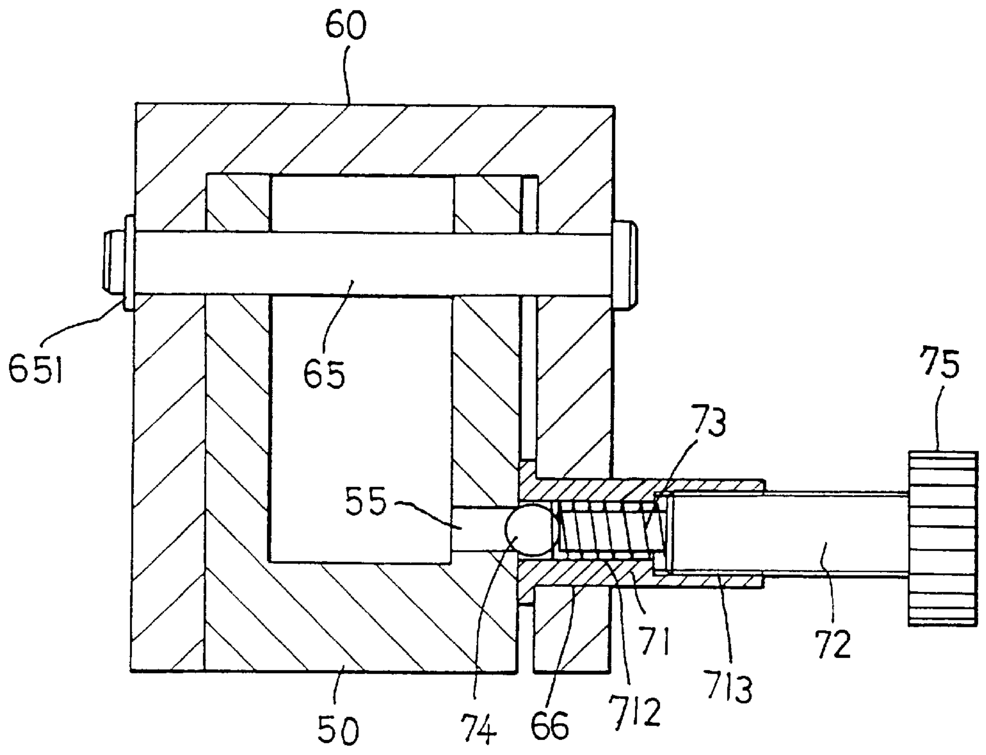
FIGS. 3 and 4 are cross sectional views illustrating operation of the angle adjusting mechanism of the support device.
Figure 4:
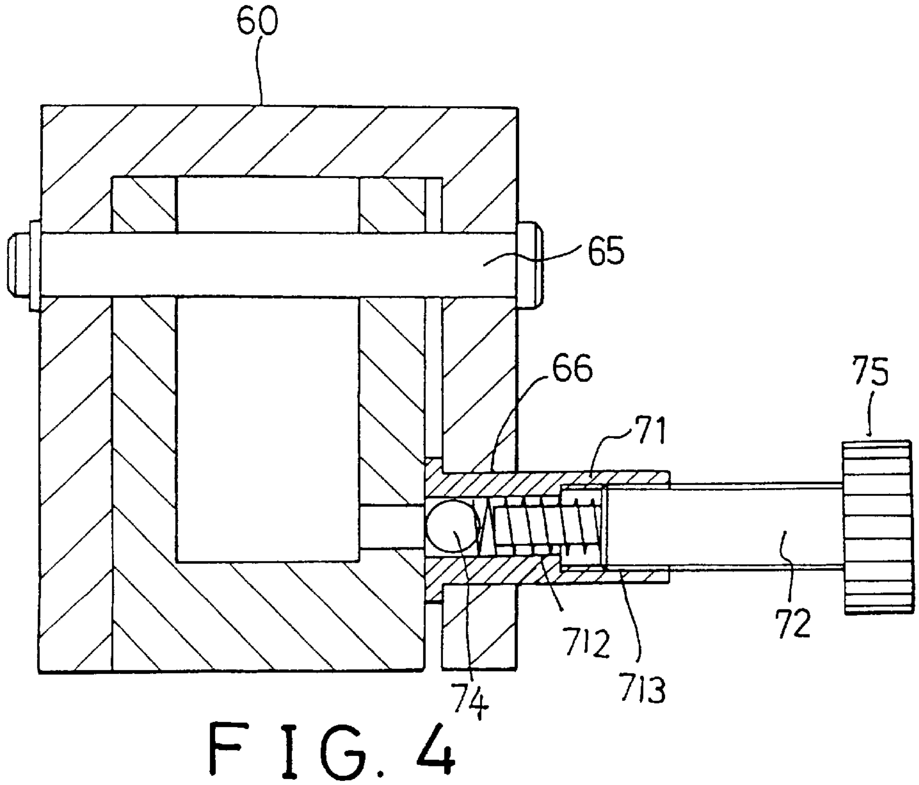
Figure 5:
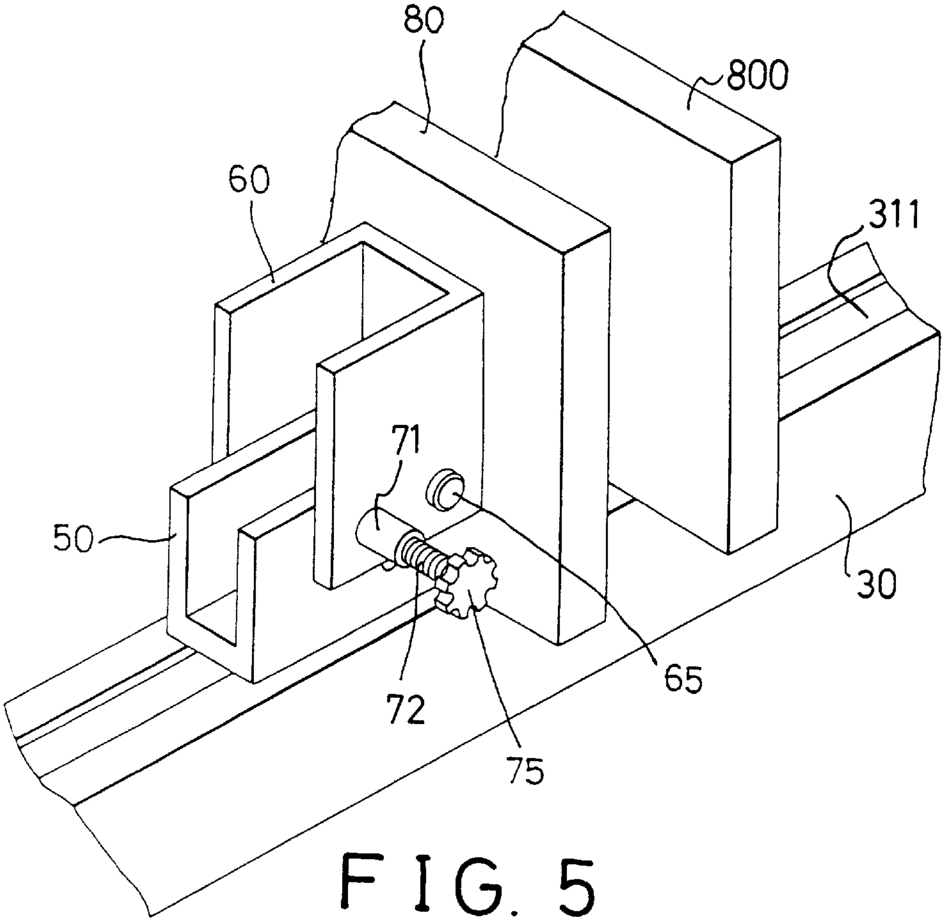
FIG. 5 is a perspective view of the angle adjusting mechanism.

Two seats 50 each includes a screw hole 511 formed in the bottom 51 for engaging with the screw 42 and for securing to the slide 40. The seat 50 includes two walls 52, 53 each having a hole 54 for engaging with a shaft 65 and each having a number of orifices 55 arranged along a curve which has a center of curvature located at the hole 54 and the shaft 65. Two brackets 60 each includes two panels 62, 63 each having a hole 64 for engaging with the shaft 65 and for allowing the bracket 60 to be pivotally coupled to the seat 50 about the shaft 65. The seat 50 is engaged between the panels 62, 63 of the bracket 60. The shafts 65 each includes an annular groove 652 for engaging with a ring 651 which may secure the shaft 65 in place. The brackets 60 each includes an upper portion 61 having two holes 611 for engaging with fastening screws 81 which may secure a second plate 80 to the brackets 60. The panel 63 includes an aperture 66 for aligning with the orifices 55 and for engaging with a sleeve 71 which includes an annular flange 711 for engaging with the panel 63 and for preventing the sleeve 71 from disengaging from the panel 63. As shown in FIGS. 3, 4, the sleeves 71 each includes an inner thread 713 for engaging with a fastener 72 and each includes a bore 712 for receiving a spring 73 and a ball 74. The spring 73 may bias the ball 74 to engage with either of the orifices 55, and the fastener 72 may solidly secure the ball 74 to either of the orifices 55. The panel 63 includes a notch 67 for aligning with the angular graduation provided beside the orifices 55. The fastener 72 includes a knob 75 for rotating the fastener 72.

In operation, as shown in FIGS. 3, 4, when the fastener 72 disengage the ball 74 from the orifice 55, the bracket 60 may rotate relative to the seat 50 about the shaft 65 such that the second plate 80 may be adjusted to different angular positions relative to the seat 50 and the beams 30. When the ball 74 is forced to selectively engage with any of the orifices 55, the plate 80 may be secured to the selected angular position relative to the seat 50. It is to be noted that the knob 75 may be used for disengaging the fastener 72 from the ball 74 and may be used for rotating the bracket 60 relative to the seat 50 to the selected angular position such that the angle adjusting process may be done with only one hand.

Only one or both of the brackets 60 may each include a fastener 72 for securing the plate 80 to the seats 50. One or two further angle adjusting mechanisms (50, 60) may be provided for adjusting the plate 800 to various angular positions relative to the beams 30. The plate 800 may be fixed to the beams 30 in a flat position (FIG. 1) for supporting a workpiece. Or in some cases, the plate 800 is secured to the beams 30 in a position perpendicular to the beam 30 (FIGS. 5, 9) for clamping a work piece 90, depending on the working processes to be done to the work piece. The sleeve 71 may also be formed integral with the bracket 60 when the bracket 60 and the sleeve 71 are formed by molding process.

Figure 6:
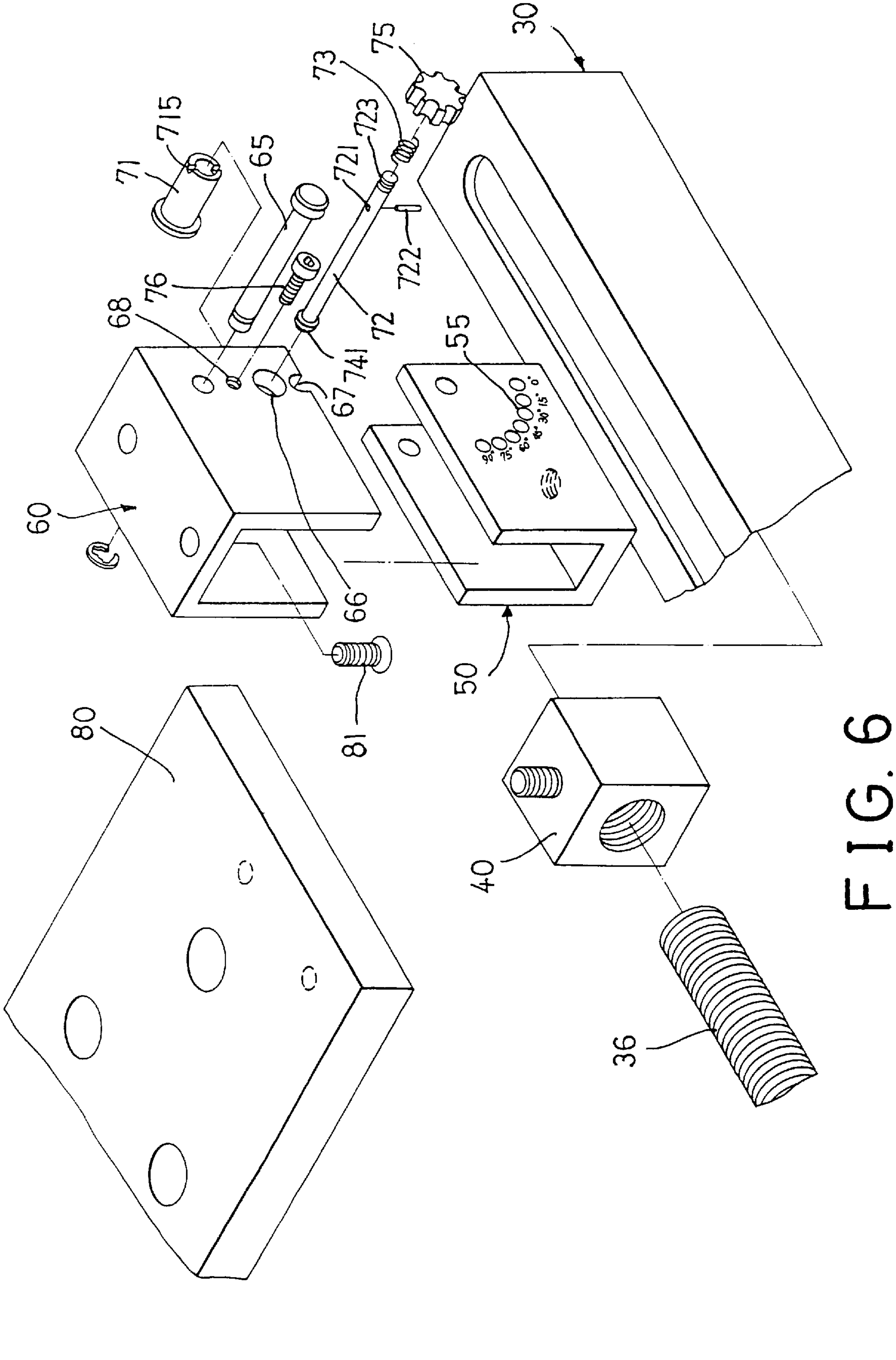
FIG. 6 is a partial exploded view showing another application of the angle adjusting mechanism.
Figure 7:
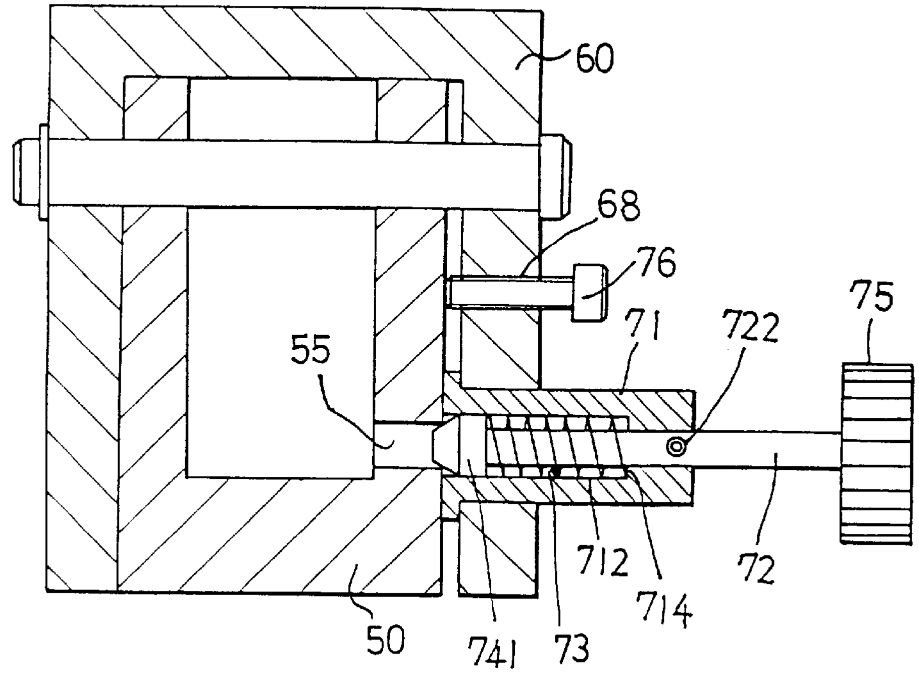
FIGS. 7 and 8 are cross sectional views illustrating operation of the angle adjusting mechanism as shown in FIG. 6.
Figure 8:
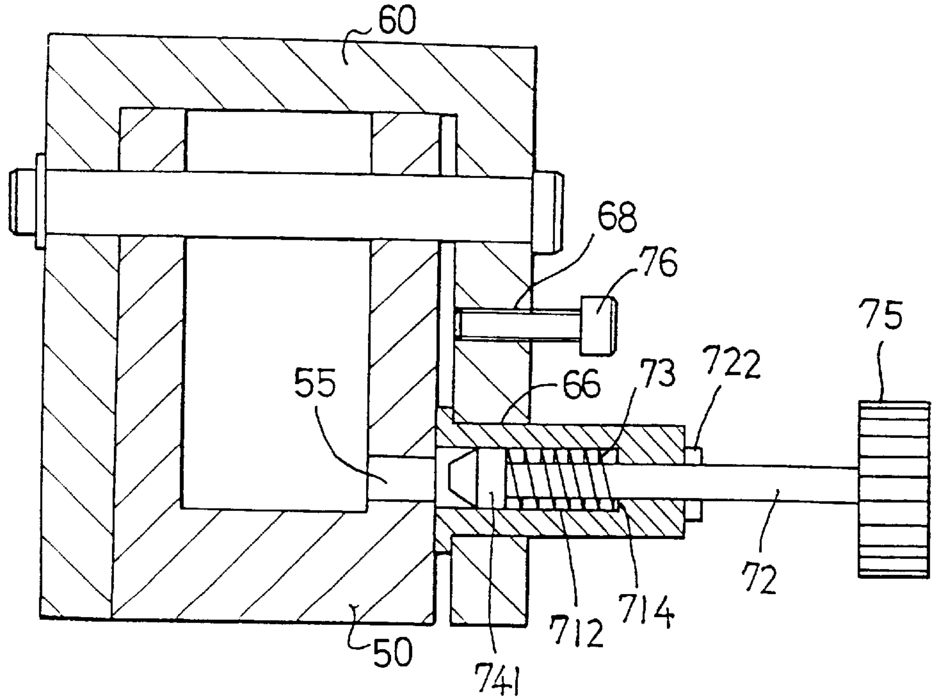

Alternatively, as shown in FIGS. 6-8, the fastener 72 may include a head 741 for engaging with the orifices 55 and may include an outer thread 723 for engaging with the knob 75. The fastener 72 is engaged through the sleeve 71 which has a pair of depressions 715. The spring 73 may bias the head 741 to engage with either of the orifices 55. The fastener 72 further includes a puncture 721 for engaging with a pin 722. The pin 722 may engage with the depressions 715 (FIG. 7) when the head 741 is engaged with either of the orifices 55 and may be disengaged from the depressions 715 and may be engaged with the end portion of the sleeve 71 (FIG. 8) for disengaging the head 741 from the orifices 55 and for allowing the bracket 60 to be rotated relative to the seat 50. Another fastener 76 is provided for securing the bracket 60 to the seat 50 when the head 741 is engaged with one of the orifices 55.

Accordingly, the angle adjusting mechanism in accordance with the present invention includes the pivotally coupled seats 50 and brackets 60 and the fastener(s) 72 for securing the ball(s) 74 to either of the orifices 55, and for allowing the plate 80 to be easily adjusted to various angular position relative to the beams 30.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A support device comprising:

a) a base including an upper portion having two beams, b) two bolts rotatable received in the beams, c) two slides slidably engaged in the beams and each including an inner thread for engaging with the bolt and for allowing the bolt to move the slide along the beam when the bolt is rotated, d) two seats secured to the slides respectively, e) two brackets pivotally coupled to the seats at a shaft, f) a plate secured to the brackets, wherein, at least one of the seats includes a number of orifices arranged in a curve which has a center of curvature located at the shaft, at least one of the brackets includes a fastener adapted to be engaged with either of the orifices for securing the plate and the brackets to the seats at various angular positions, the bracket includes a sleeve for receiving the fastener, the sleeve includes a bore and an inner thread, the fastener includes an outer thread for engaging with the inner thread of the sleeve, a ball is engaged in the sleeve and engaged between the fastener and the seat for engaging with either of the orifices, and a spring is engaged between the ball and the fastener for biasing the ball to engage with either of the orifices.

2. The support device as claimed in claim 1, wherein the bracket includes an aperture, the sleeve is engaged in the aperture and includes an annular flange for engaging with the bracket and for preventing the sleeve from being disengaged from the bracket.

3. The support device as claimed in claim 1, wherein the seat includes a number of angular graduations provided beside the orifices, the bracket includes a notch for aligning with the graduations.

4. A support device comprising:

a) a base including an upper portion having two beams, b) two bolts rotatably received in the beams, c) two slides slidably engaged in the beams and each including an inner thread for engaging with the bolt and for allowing the bolt to move the slide along the beam when the bolt is rotated, d) two seats secured to the slides respectively, e) two brackets pivotally coupled to the seats at a shaft, f) a Plate secured to the brackets, wherein, at least one of the seats includes a number of orifices arranged in a curve which has a center of curvature located at the shaft, at least one of the brackets includes a fastener adapted to be engaged with either of the orifices for securing the plate and the brackets to the seats at various angular positions, the bracket includes a sleeve for receiving the fastener, the sleeve includes a pair of depressions, the fastener includes a head formed on one end and includes a pin secured to the other end, and a spring is engaged between the sleeve and the head for biasing the head to engage with either of the orifices and for biasing the pin to engage with the depressions of the sleeve.

* * * * *